(12) United States Patent
Nakamura et al.

(10) Patent No.: US 10,725,369 B2
(45) Date of Patent: Jul. 28, 2020

(54) LIGHT SOURCE DEVICE AND IMAGE DISPLAY APPARATUS

(71) Applicants: Kasumi Nakamura, Kanagawa (JP);
Yohei Takano, Kanagawa (JP);
Hirotoshi Nakayama, Kanagawa (JP);
Naoki Nakamura, Saitama (JP)

(72) Inventors: Kasumi Nakamura, Kanagawa (JP);
Yohei Takano, Kanagawa (JP);
Hirotoshi Nakayama, Kanagawa (JP);
Naoki Nakamura, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/533,884

(22) Filed: Aug. 7, 2019

(65) Prior Publication Data
US 2020/0064719 A1    Feb. 27, 2020

(30) Foreign Application Priority Data
Aug. 23, 2018 (JP) .................. 2018-156693

(51) Int. Cl.
| | |
|---|---|
| G03B 21/28 | (2006.01) |
| F21V 7/00 | (2006.01) |
| G03B 21/20 | (2006.01) |
| G02B 26/08 | (2006.01) |

(52) U.S. Cl.
CPC .......... *G03B 21/204* (2013.01); *F21V 7/0083* (2013.01); *G02B 26/0825* (2013.01); *G03B 21/2066* (2013.01); *G03B 21/28* (2013.01)

(58) Field of Classification Search
CPC .. G03B 21/204; G03B 21/2066; G03B 21/28; G02B 26/0825; F21V 7/0083
See application file for complete search history.

(56) References Cited

U.S. PATENT DOCUMENTS

| | | |
|---|---|---|
| 2014/0268068 A1 | 9/2014 | Takahashi et al. |
| 2014/0268072 A1 | 9/2014 | Takahashi et al. |
| 2014/0268073 A1 | 9/2014 | Takano |
| 2014/0340658 A1 | 11/2014 | Takano et al. |
| 2015/0370048 A1 | 12/2015 | Takano |
| 2016/0091700 A1 | 3/2016 | Takano |
| 2016/0103304 A1 | 4/2016 | Takano et al. |

(Continued)

FOREIGN PATENT DOCUMENTS

| | | |
|---|---|---|
| JP | 2011-013320 | 1/2011 |
| JP | 2012-123179 | 6/2012 |
| JP | 2013-065414 | 4/2013 |

*Primary Examiner* — William C. Dowling
(74) *Attorney, Agent, or Firm* — Oblon, McClelland, Maier & Neustadt, L.L.P.

(57) ABSTRACT

A light source device includes: a light source to emit first color light; a fluorescent member having a first region that includes a fluorescent body to convert at least a part of the first color light into second color light different from the first color light when irradiated with the first color light and a second region to transmit the first color light; a wave plate; a reflecting member to reflect the first color light transmitted through the wave plate; and an optical path separating element provided on an optical path between the light source and the fluorescent member and transmit one of the first color light emitted from the light source and reflected light of the first color light by the reflecting member, and reflect another one.

10 Claims, 6 Drawing Sheets

(56) References Cited

U.S. PATENT DOCUMENTS

| | | |
|---|---|---|
| 2017/0059836 A1 | 3/2017 | Takano |
| 2017/0059971 A1 | 3/2017 | Takano et al. |
| 2017/0064268 A1 | 3/2017 | Shibayama et al. |
| 2018/0003934 A1 | 1/2018 | Takano et al. |
| 2018/0074302 A1 | 3/2018 | Takano et al. |
| 2018/0088452 A1* | 3/2018 | Tajiri .................. H04N 9/31 |
| 2018/0088453 A1* | 3/2018 | Yasumatsu ........... G02B 27/141 |

* cited by examiner

LIGHT SOURCE DEVICE AND IMAGE DISPLAY APPARATUS

CROSS-REFERENCE TO RELATED APPLICATIONS

This patent application is based on and claims priority pursuant to 35 U.S.C. § 119(a) to Japanese Patent Application No. 2018-156693, filed on Aug. 23, 2018, in the Japan Patent Office, the entire disclosure of which is incorporated by reference herein.

BACKGROUND

Technical Field

Embodiments of the present disclosure relate to a light source device and an image display apparatus.

Related Art

In recent years, projectors that magnify and project various images are widely used. The projector focuses light emitted from a light source on a spatial light modulation element such as a digital micromirror device (DMD) or a liquid crystal display element, and displays the light emitted from the spatial light modulation element and modulated by an image signal as a color image on a screen. Conventionally, a super high-pressure mercury lamp or the like with high brightness is mainly used for the projector. However, due to a short life of the super high-pressure mercury lamp, a user has to frequently perform maintenance. In order to solve these problems, in recent years, number of projectors using a laser light source or a light-emitting diode (LED) light source instead of the super high-pressure mercury lamp is increased. This is because the laser light source has a longer life than the super high-pressure mercury lamp, and color reproducibility of the laser light source is superior due to monochromaticity thereof.

The projector produces the image by irradiating the image display element such as the above-described DMD with three colors of red, green, and blue. Although all of these three colors can be generated by the laser light source, luminous efficiency of each of a green laser and a red laser is lower than the luminous efficiency of a blue laser. Thus, such a method is general that irradiates a fluorescent body with the blue laser as excitation light so as to generate green light and red light from fluorescent light, wavelength of which is converted by the fluorescent body.

Several tens [W] of the excitation light are focused on and emitted to the fluorescent body. Thus, degraded efficiency and aging occur to the fluorescent body due to burnout or a temperature increase. For this reason, a fluorescent body layer is formed on a disc, and the fluorescent layer and the disc are made to rotate. In this way, an emitted position of the excitation light is prevented from being concentrated at one point. This disc is called a fluorescent wheel and configured that the fluorescent body is sealed by a transparent resin such silicon on a circular reflector or a transparent base material. This fluorescent body layer is formed in a fan shape or an annular shape along an outer circumference of the disc.

As a light source device using the DMD and the fluorescent wheel as described above, in order to downsize an entire device, a device that uses a part of the fluorescent wheel as the reflector is proposed. In such a technique, the excitation light is reflected by the fluorescent wheel in the same direction as the fluorescent light, and a wave plate (quarter wave plate) and a polarization separation element are used to separate optical paths such that the reflected excitation light and the fluorescent light do not return to an excitation light source. In this way, it is configured that the same DMD is irradiated with the excitation light and the fluorescent light.

SUMMARY

In order to solve the above-described problem and achieve an object, embodiments of the present disclosure include: a light source configured to emit first color light; a fluorescent member having a first region that includes a fluorescent body configured to convert at least a part of the first color light into second color light different from the first color light when being irradiated with the first color light and a second region configured to transmit the first color light; a wave plate provided on a side opposite to an incident side of the first color light of the fluorescent member and configured to generate a phase difference of the first color light; a reflecting member configured to reflect the first color light transmitted through the wave plate; and an optical path separating element provided on an optical path between the light source and the fluorescent member and configured to transmit one of the first color light emitted from the light source and reflected light of the first color light by the reflecting member, reflect another one of the first color light emitted from the light source and the reflected light of the first color light by the reflecting member, and guide the second color light to the same optical path as an optical path of the reflected light. The first color light transmitted through the second region is transmitted through the wave plate, is thereafter reflected by the reflecting member, and is transmitted through the wave plate again.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
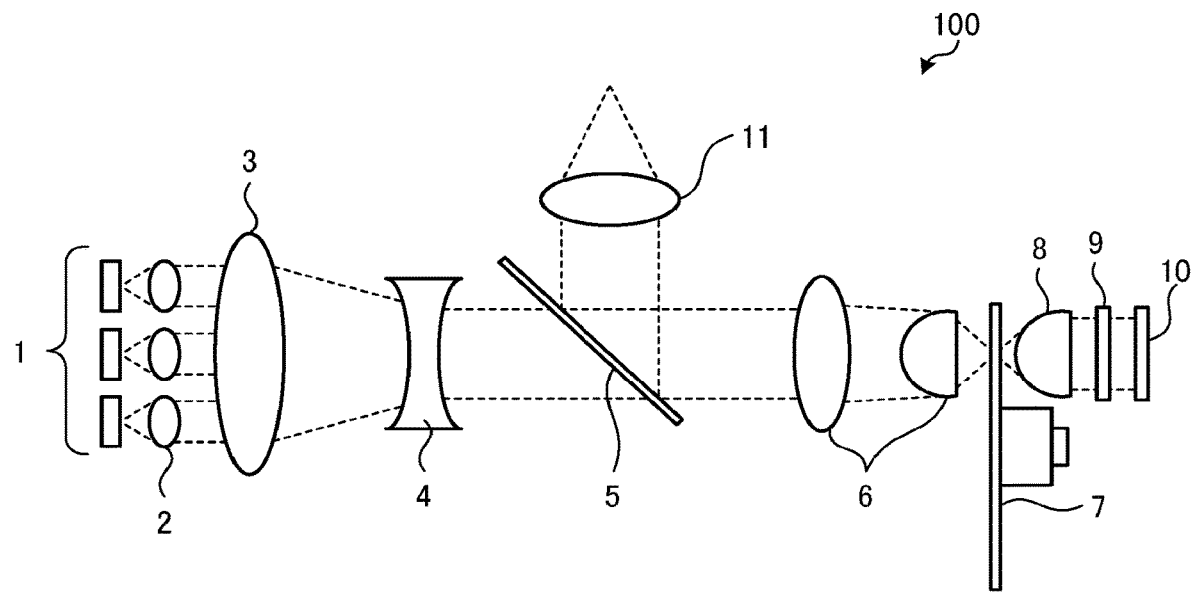
FIG. 1 is a schematic configuration view of a light source device according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of the present disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

A detailed description will hereinafter be made on a light source device and an image display apparatus according to each embodiment of the present disclosure with reference to the drawings. This disclosure is not limited to the following embodiments. Components in the following embodiments include components that can easily conceived by those skilled in the art, components that are substantially the same, and components within the so-called equivalent range. Furthermore, various omissions, replacements, and changes can be made to the components within the scope that does not depart from the gist of the following embodiments.

First Embodiment

Figure 2A:
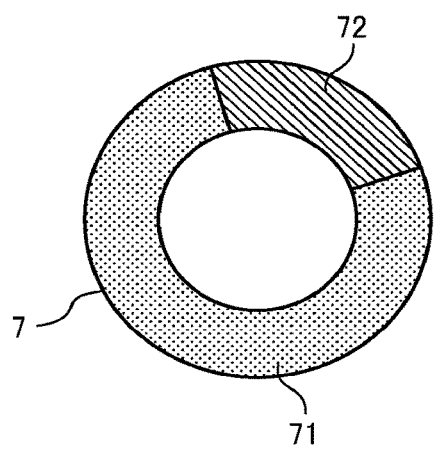
FIGS. 2A and 2B are views illustrating an example of a configuration of a fluorescent body unit according to the first embodiment.
Figure 2B:
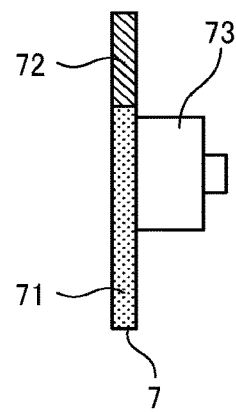

FIG. 1 is a schematic configuration diagram of a light source device according to a first embodiment. FIGS. 2A and 2B are views illustrating an example of a configuration of a fluorescent body unit according to the first embodiment. A description will be made on a configuration of a light source device 100 according to the present embodiment with reference to FIG. 1 and FIGS. 2A and 2B.

As illustrated in FIG. 1, the light source device 100 according to the present embodiment includes a laser light source 1 (an example of a light source), a coupling lens 2, a large aperture lens 3, a negative lens 4, an optical path separating element 5, a light collection optical system 6, a fluorescent body unit 7 (fluorescent member), a dioptric system 8, a quarter wave plate 9 (an example of a wave plate), a reflecting member 10, and a positive lens 11. Along a forward direction of movement of laser light emitted from the laser light source 1, the coupling lens 2, the large aperture lens 3, the negative lens 4, the optical path separating element 5, the light collection optical system 6, the fluorescent body unit 7, the dioptric system 8, the quarter wave plate 9, and the reflecting member 10 are arranged in this order.

The laser light source 1 is a light source unit in which light sources emitting a plurality of rays of the laser light are arranged in an array. For example, the laser light source 1 emits blue laser light whose center of emission intensity is 455 [nm]. Hereinafter, the blue laser light will simply be referred to as blue light. The blue light emitted from the laser light source 1 is linearly polarized light, a polarization direction of which is a fixed direction, and is also used as excitation light for exciting a fluorescent body provided in the fluorescent body unit, which will be described later.

The light emitted from the laser light source 1 may be any light having a wavelength capable of exciting the fluorescent body unit, which will be described later, and is not limited to light in a blue wavelength band. In addition, although the laser light source 1 includes the plurality of light sources, the laser light source 1 is not limited thereto. The laser light source 1 may be constructed of the single light source. Furthermore, although the plurality of light sources are arranged in the array in the laser light source 1, the laser light source 1 is not limited thereto. The laser light source 1 may have another arrangement configuration.

The coupling lens 2 is a lens that receives the blue light emitted from the laser light source 1 and converts the blue light into parallel light (collimated light). Hereinafter, the parallel light is a concept that includes completely collimated (parallelized) light and substantially parallelized light. The large aperture lens 3 is a lens that has positive power and that collects and synthesizes the parallel light emitted from the coupling lens 2. The negative lens 4 is a lens that converts the blue light collected by the large aperture lens 3 into the parallel light.

The optical path separating element 5 is a polarization separation element that is arranged to be inclined with respect to a propagation direction of the blue light emitted from the negative lens 4. Here, like the blue light emitted from the negative lens 4, blue light (first color light) that is linearly polarized light in a particular polarization direction (first polarization direction) originated from the blue light emitted from the laser light source 1 may hereinafter be referred to as first linearly polarized light. In addition, the first linearly polarized light will be described as P-polarized light. That is, the laser light source 1 and the optical path separating element 5 are located at such relative positions that the first linearly polarized light becomes the P-polarized light with respect to an incident surface of the optical path separating element 5. The optical path separating element 5 has an optical characteristic to transmit the first linearly polarized light, which is the P-polarized light emitted from the negative lens 4, and reflect fluorescent light (second color light) converted from the first linearly polarized light by the fluorescent body in the fluorescent body unit 7, which will be described later, and the blue light as S-polarized light converted from the first linearly polarized light by a function of the quarter wave plate 9 and a function of the reflecting member 10, which will be described later. Hereinafter, the blue light, which is the S-polarized light converted from the first linearly polarized light by the function of the quarter wave plate 9 and the function of the reflecting member 10, that is, the linearly polarized light having a polarization direction (second polarization direction) that is orthogonal to the polarization direction (first polarization direction) of the first linearly polarized light may be referred to as second linearly polarized light. That is, the optical path separating element 5 guides the first linearly polarized light and each of the fluorescent light and the second linearly polarized light to different optical paths. As will be described later, the fluorescent light converted by the fluorescent body unit 7 is light, whose center of emission intensity is 550 [nm], in a yellow wavelength range, for example. The second linearly polarized light converted by the fluorescent body unit 7 is the blue light whose center of emission intensity is 455 [nm], for example.

As described above, the first linearly polarized light is described as the P-polarized light, and the second linearly polarized light is described as the S-polarized light. However, the first linearly polarized light and the second linearly polarized light are not limited thereto. In the case where the first linearly polarized light is the S-polarized light, the second linearly polarized light is the P-polarized light.

The light collection optical system 6 is an optical system that collects the first linearly polarized light transmitted through the optical path separating element 5 and guides the first linearly polarized light to the fluorescent body unit 7.

The fluorescent body unit 7 is a unit that switches between a function of transmitting the first linearly polarized light emitted from the light collection optical system 6 and guiding the first linearly polarized light to the dioptric system 8 and a function of causing the first linearly polarized light to act as the excitation light and converting the excitation light into the fluorescent light whose wavelength range differs by the fluorescent body.

More specifically, the fluorescent body unit 7 has a structure illustrated in FIGS. 2A and 2B. FIG. 2A is a view of a case where the fluorescent body unit 7 is viewed from an incident direction of the first linearly polarized light, and FIG. 2B is a view of a case where the fluorescent body unit 7 is viewed from a perpendicular direction to the incident direction of the first linearly polarized light. As illustrated in FIG. 2A, for example, the fluorescent body unit 7 has an annular member, and the member is defined into a plurality of regions along a circumferential direction. More specifically, the annular member of the fluorescent body unit 7 is divided into: a first region 71 in which the fluorescent body as a wavelength converting member is applied to a reflecting member; and a second region 72 formed of a transmitting member that transmits the light. In the case where the first linearly polarized light emitted from the light collection optical system 6 is incident on the first region 71, the first linearly polarized light acts as the excitation light for the fluorescent body, and a wavelength of the excitation light is converted by the fluorescent body. For example, the excitation light is converted into the fluorescent light, whose center of the emission intensity is 550 [nm], in the yellow wavelength range, and is subjected to Lambertian reflection by action of the fluorescent body and action of the reflecting member. In the case where the first linearly polarized light emitted from the light collection optical system 6 is incident on the second region 72, the wavelength of the first linearly polarized light is not converted. The first linearly polarized light is transmitted through the second region 72 and travels to the dioptric system 8.

The fluorescent body as the wavelength converting member is not limited to converting the first linearly polarized light into the light in the yellow wavelength range as described above. For example, the fluorescent body may convert the first linearly polarized light into light in a green wavelength range or light in a red wavelength range. In addition, the first region 71 may be divided into regions of a plurality of types of the fluorescent bodies.

Furthermore, the annular member of the fluorescent body unit 7 is not limited to being defined into the two regions (the first region 71 and the second region 72). For example, the annular member of the fluorescent body unit 7 may be configured that the plurality of first regions 71 and the plurality of second regions 72 are alternately arranged along the circumferential direction.

As illustrated in FIG. 2B, a drive unit 73 such as a motor is coupled to the annular member, which is configured to include the first region 71 and the second region 72. The annular member, which is formed of the first region 71 and the second region 72, rotates in the circumferential direction when the drive unit 73 is rotationally driven about an axis orthogonal to a surface of the member. Just as described, when the annular member rotates in the circumferential direction, the first linearly polarized light emitted from the light collection optical system 6 is sequentially incident on the first region 71 and the second region 72.

The dioptric system 8 is an optical system that converts the first linearly polarized light transmitted through the second region 72 of the fluorescent body unit 7 into the parallel light.

The quarter wave plate 9 is an optical member that provides a phase difference ($\lambda/4$) to a polarization component of the incident light, so as to convert the first linearly polarized light emitted from the dioptric system 8 into circularly polarized light. The quarter wave plate 9 has a predetermined transmittance. For example, in the case of the transmittance of 98%, 2% of light energy is lost. Hereinafter, the circularly polarized light is a concept that includes polarized light, in which a vibration direction of an electric field component rotates in a perfect circular shape, and elliptically polarized light.

The reflecting member 10 is a member that reflects the circularly polarized light converted from the first linearly polarized light by the quarter wave plate 9. In this case, the phase of the circularly polarized light reflected by the reflecting member 10 is reversed. Thus, the circularly polarized light becomes the circularly polarized light in a reverse direction.

The positive lens 11 is a lens that collects the light (the fluorescent light and the second linearly polarized light) reflected by the optical path separating element 5 and emits such light to the outside of the light source device 100.

Figure 3:
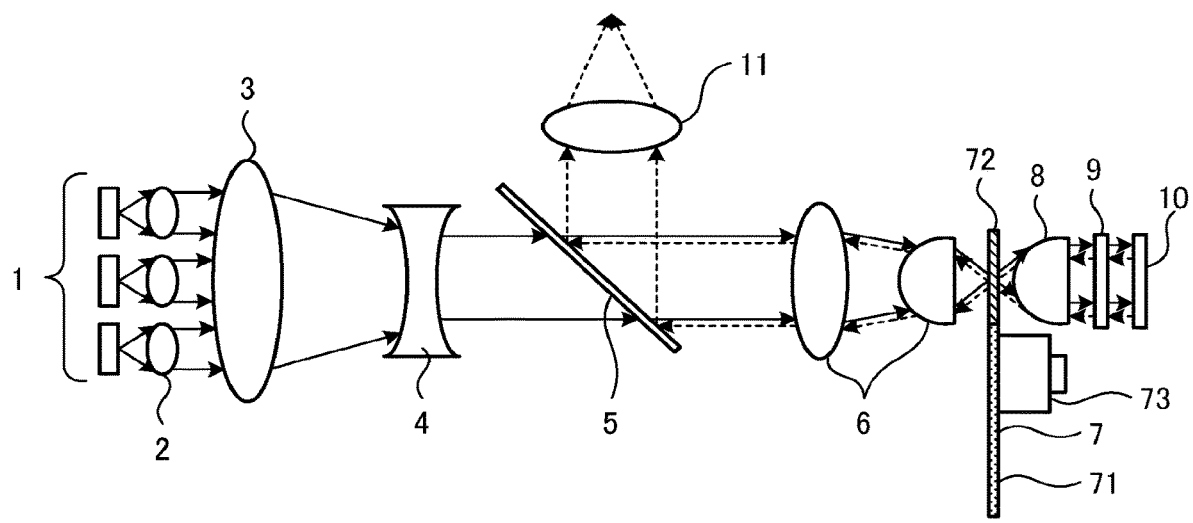
FIG. 3 is a view illustrating a blue light path in the light source device according to the first embodiment.

FIG. 3 is a view illustrating a blue light path in the light source device according to the first embodiment. A description will be made on behavior of the light on the blue light path in the light source device 100 with reference to FIG. 3. Here, the blue light path means an optical path on which, of the first linearly polarized light emitted by the laser light source 1, the light to be transmitted through the second region 72 of the fluorescent body unit 7 travels.

First, the laser light source 1 emits the blue light (the first linearly polarized light) as the linearly polarized light (for example, the P-polarized light with respect to the incident surface of the optical path separating element 5) whose polarization direction is the fixed direction. The coupling lens 2 converts the first linearly polarized light emitted from the laser light source 1 into the parallel light (the collimated light). The first linearly polarized light (the parallel light) emitted from the coupling lens 2 is collected and synthesized by the large aperture lens 3, and is thereafter converted into the parallel light by the negative lens 4. The first linearly polarized light (the parallel light) emitted from the negative lens 4 is incident on the optical path separating element 5. However, since the first linearly polarized light (the parallel light) is the P-polarized light, the first linearly polarized light (the parallel light) is transmitted through the optical path separating element 5 and travels to the light collection optical system 6. The light collection optical system 6 collects the first linearly polarized light transmitted through the optical path separating element 5.

Here, it is assumed that the first linearly polarized light collected by the light collection optical system 6 is incident on the second region 72 of the fluorescent body unit 7. The first linearly polarized light incident on the second region 72 is transmitted through the second region 72 and travels to the dioptric system 8. The dioptric system 8 converts the first linearly polarized light transmitted through the second region 72 into the parallel light. The first linearly polarized light (the parallel light) emitted from the dioptric system 8 is transmitted through the quarter wave plate 9 and thereby converted into the circularly polarized light. The circularly polarized light emitted from the quarter wave plate 9 is reflected by the reflecting member 10, and the phase of the circularly polarized light is reversed. As a result, the circularly polarized light becomes the circularly polarized light in the reverse direction and travels to the quarter wave plate 9 again.

The circularly polarized light in the reverse direction, which is reflected by the reflecting member 10, is transmitted through the quarter wave plate 9 and thus converted into the second linearly polarized light, which is the linearly polarized light (the blue light) having the orthogonal polarization direction to the polarization direction of the first linearly polarized light. In the case where the first linearly polarized light is the P-polarized light, the second linearly polarized light is the S-polarized light. The dioptric system 8 collects the second linearly polarized light converted by the quarter wave plate 9. The second linearly polarized light collected by the dioptric system 8 is incident on the second region 72 of the fluorescent body unit 7. The second linearly polarized light incident on the second region 72 is transmitted through the second region 72 and travels to the light collection optical system 6. The light collection optical system 6 converts the second linearly polarized light transmitted through the second region 72 into the parallel light. The second linearly polarized light (the parallel light) emitted from the light collection optical system 6 is incident on the optical path separating element 5. However, since the second linearly polarized light (the parallel light) is the S-polarized light, the second linearly polarized light (the parallel light) is reflected by the optical path separating element 5 and travels to the positive lens 11. The positive lens 11 collects the second linearly polarized light reflected by the optical path separating element 5 and emits the second linearly polarized light to the outside of the light source device 100.

Figure 4:
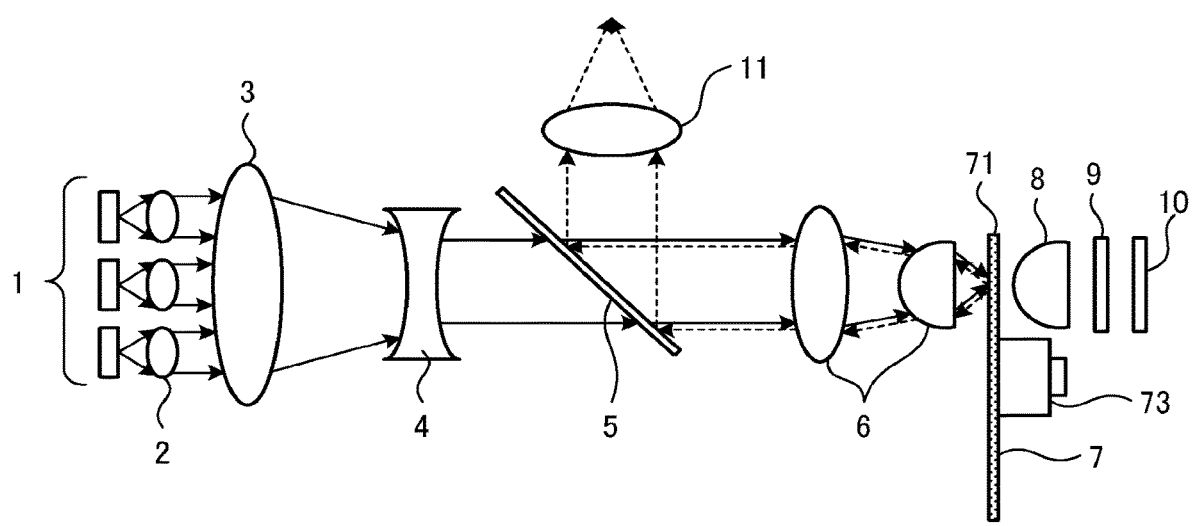
FIG. 4 is a view illustrating a fluorescent light path in the light source device according to the first embodiment.

FIG. 4 is a view illustrating a fluorescent light path in the light source device according to the first embodiment. A description will be made on behavior of the light on the fluorescent light path in the light source device 100 with reference to FIG. 4. Here, as described above, the fluorescent light path is the optical path to generate and emit (emit to the outside) the fluorescent light, and means the optical path on which, of the first linearly polarized light emitted by the laser light source 1, the light to be reflected by the first region 71 of the fluorescent body unit 7 travels.

The behavior of the first linearly polarized light emitted from the laser light source 1 is the same as the behavior of the first linearly polarized light on the blue light path described above with reference to FIG. 3 until the first linearly polarized light is collected by the light collection optical system 6. Here, it is assumed that the first linearly polarized light collected by the light collection optical system 6 is incident on the first region 71 of the fluorescent body unit 7. The first linearly polarized light incident on the first region 71 acts as the excitation light for the fluorescent body, and the wavelength of the excitation light is converted by the fluorescent body. For example, the excitation light is converted into the fluorescent light in the yellow wavelength range, and is subjected to the Lambertian reflection by the action of the fluorescent body and the action of the reflecting member. The light collection optical system 6 converts the fluorescent light subjected to the Lambertian reflection by the first region 71 into the parallel light. The fluorescent light (the parallel light) emitted from the light collection optical system 6 is reflected by the optical path separating element 5 and travels to the positive lens 11. The positive lens 11 collects the fluorescent light reflected by the optical path separating element 5 and emits the fluorescent light to the outside of the light source device 100.

As described above with reference to FIG. 4 and FIG. 5, in the case where the first linearly polarized light emitted from the light collection optical system 6 is incident on the second region 72 due to the rotation of the annular member of the fluorescent body unit 7, the first linearly polarized light is switched to exhibit the behavior on the blue light path. In the case where the first linearly polarized light is incident on the first region 71, the first linearly polarized light is switched to exhibit the behavior on the fluorescence light path. In addition, due to operation of the light source device 100 as described above, the first linearly polarized light, which is the blue light emitted from the laser light source 1, is substantially separated into the second linearly polarized light as the blue light and the fluorescent light, is guided to the different optical path from the optical path of the first linearly polarized light, and is emitted to the outside of the light source device 100.

As it has been described so far, in the light source device 100 according to the present embodiment, the quarter wave plate 9 is arranged on a downstream side of the fluorescent body unit 7. Thus, it is configured that, of the first linearly polarized light emitted from the laser light source 1 and transmitted through the optical path separating element 5, the blue light transmitted through the second region 72 of the fluorescent body unit 7 is transmitted through the quarter wave plate 9. That is, it is configured that, of the first linearly polarized light transmitted through the optical path separating element 5, the fluorescent light whose wavelength is converted and which is reflected by the first region 71 of the fluorescent body unit 7 is not transmitted through the quarter wave plate 9. Thus, light use efficiency of the fluorescent light is not reduced in association with the transmission through the quarter wave plate 9. Therefore, it is possible to suppress the reduction in the light use efficiency in the fluorescent light path, that is, the reduction in the light use efficiency of the fluorescent light.

Of the first linearly polarized light transmitted through the optical path separating element 5, almost all the blue light incident on the first region 71 of the fluorescent body unit 7 is converted into the fluorescent light. However, a part of the blue light is not converted into the fluorescent light, remains as the first linearly polarized light, and is reflected by first region 71. Here, in the conventional configuration, the light corresponding to the first linearly polarized light, which is not converted into the fluorescent light, is transmitted through the quarter wave plate and thereby becomes the light corresponding to the second linearly polarized light. As a result, such light is guided to the same optical path as the optical path of the fluorescent light. On the contrary, in the present embodiment, the first linearly polarized light, which is not converted into the fluorescent light, is not transmitted through the quarter wave plate 9. Thus, the polarization direction of the first linearly polarized light is not changed, and the first linearly polarized light is incident on the optical path separating element 5. As a result, the first linearly polarized light is guided to the different optical path from the optical path of the fluorescent light. Therefore, the blue light is not mixed in the fluorescent light generated by the light source device 100 according to the present embodiment.

Since the light collection optical system 6 is arrange on an upstream side of the fluorescent body unit 7, a light collection spot on the fluorescent body unit 7 (the first region 71) can be made small. As a result, generation of the fluorescent light by the fluorescent body is facilitated, and the light use efficiency of the fluorescent light can be improved.

Since the dioptric system 8, which converts the first linearly polarized light into the parallel light, is arranged on a downstream side of the fluorescent body unit 7, it is possible to suppress occurrence of vignetting in the subsequent optical system. In addition, the first linearly polarized light incident on the quarter wave plate 9 is the substantially parallel light. Thus, even in the case where the quarter wave plate 9 has incident angle dependency on the phase difference and the light energy loss, the phase difference is not shifted, and the energy loss is suppressed. Therefore, it is possible to suppress the reduction in the light use efficiency of the blue light.

Second Embodiment

A description will be made on a light source device according to a second embodiment while being centered on differences from the light source device 100 according to the first embodiment. In the first embodiment, the description has been made on the configuration that the dioptric system 8 converts the first linearly polarized light transmitted through the second region 72 of the fluorescent body unit 7 into the parallel light. In the present embodiment, a description will be made on a configuration of the light source device that does not include the dioptric system 8.

Figure 5:
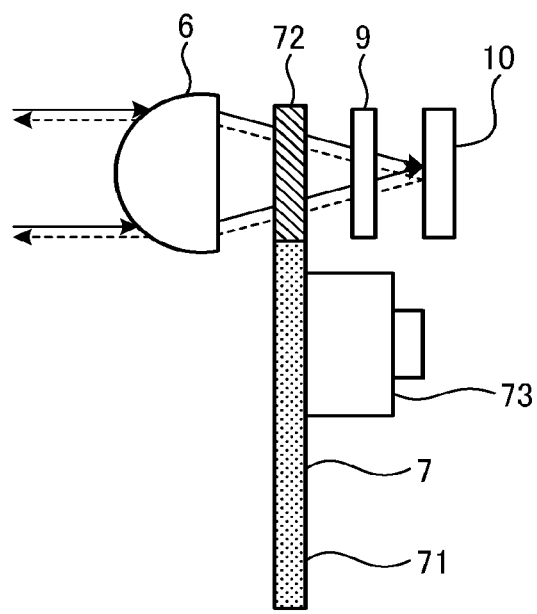
FIG. 5 is a configuration diagram of a main portion of a light source device according to a second embodiment.

FIG. 5 is a configuration diagram of a main portion of the light source device according to the second embodiment. A description will be made on the configuration of the main portion of the light source device according to the present embodiment with reference to FIG. 5. In the configuration of the main portion illustrated in FIG. 5, in the case where components have the same functions as the functions of the components of the light source device 100 according to the first embodiment illustrated in FIG. 1, such components will be denoted by the same reference numerals.

The light source device according to the present embodiment is configured not to include the dioptric system 8 among the components provided in the light source device 100 according to the first embodiment. In such a configuration of the light source device, FIG. 5 illustrates an arrangement relationship among the light collection optical system 6, the fluorescent body unit 7, the quarter wave plate 9, and the reflecting member 10. In addition, FIG. 5 indicates the light before being reflected by the reflecting member 10 by solid lines and the light after being reflected by the reflecting member 10 by broken lines.

It is assumed that, in the case where the first linearly polarized light, which is the blue light collected by the light collection optical system 6, is transmitted through the second region 72 of the fluorescent body unit 7, the first linearly polarized light is next transmitted through the quarter wave plate 9 and collected near a reflecting surface of the reflecting member 10. In this case, it is desirable that the quarter wave plate 9 has no incident angle dependency on the phase difference and the light energy loss. For example, the quarter wave plate 9 may have no incident angle dependency within a range where an incident angle of the incident first linearly polarized light is 30 degrees or smaller.

As described so far, in the present embodiment, the first linearly polarized light, which is collected by the light collection optical system 6, is incident on the quarter wave plate 9. However, since the quarter wave plate 9 that has no incident angle dependency on the phase difference and the light energy loss is used, it is possible to suppress the reduction in the light use efficiency on the blue light path.

In addition, since the first linearly polarized light, which is collected by the light collection optical system 6, is incident on the quarter wave plate 9, compared to the quarter wave plate 9 according to the first embodiment, it is possible to downsize the quarter wave plate 9 and reduce cost of the quarter wave plate 9.

Third Embodiment

A description will be made on a light source device according to a third embodiment while being centered on differences from the light source device 100 according to the first embodiment. In the first embodiment, the description has been made on the configuration that the dioptric system 8 converts the first linearly polarized light transmitted through the second region 72 of the fluorescent body unit 7 into the parallel light. In the present embodiment, a description will be made on a configuration of the light source device that does not include the dioptric system 8 and includes a reflecting member having the positive power instead of the reflecting member 10.

Figure 6:
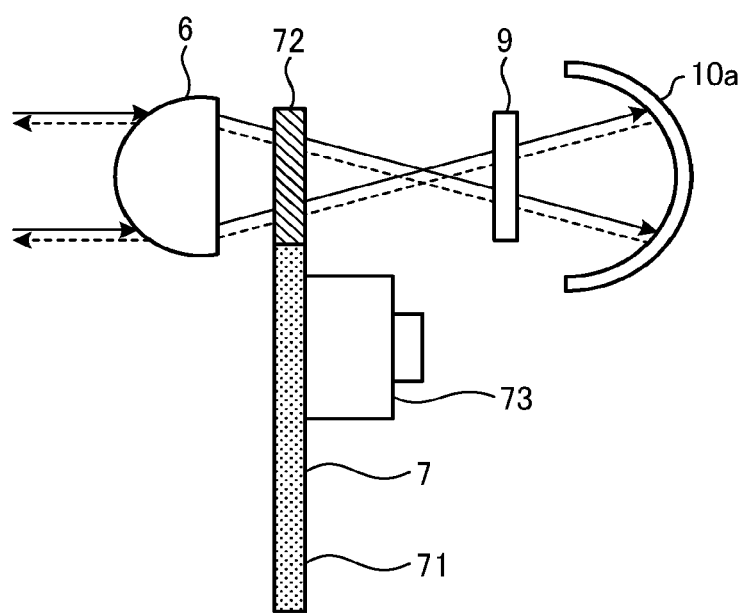
FIG. 6 is a configuration diagram of a main portion of a light source device according to a third embodiment.

FIG. 6 is a configuration diagram of a main portion of the light source device according to the third embodiment. A description will be made on the configuration of the main portion of the light source device according to the present embodiment with reference to FIG. 6. In the configuration of the main portion illustrated in FIG. 6, in the case where components have the same functions as the functions of the components of the light source device 100 according to the first embodiment illustrated in FIG. 1, such components will be denoted by the same reference numerals.

The light source device according to the present embodiment is configured not to include the dioptric system 8 among the components provided in the light source device 100 according to the first embodiment and to include a reflecting member 10a instead of the reflecting member 10. In such a configuration of the light source device, FIG. 6 illustrates an arrangement relationship among the light collection optical system 6, the fluorescent body unit 7, the quarter wave plate 9, and the reflecting member 10a. In addition, FIG. 6 indicates the light before being reflected by the reflecting member 10a by solid lines and the light after being reflected by the reflecting member 10a by broken lines.

The reflecting member 10a is a concave mirror whose reflecting surface having the positive power has a concave shape, and reflects the circularly polarized light converted from the first linearly polarized light by the quarter wave plate 9.

In the case where the first linearly polarized light, which is the blue light collected by the light collection optical system 6, is transmitted through the second region 72 of the fluorescent body unit 7, the first linearly polarized light is collected near the fluorescent body unit 7, is next transmitted through the quarter wave plate 9, and is reflected by the reflecting surface in the concave shape of the reflecting member 10a. At this time, the reflecting surface in the concave shape of the reflecting member 10a causes the reflected light in a collected state to travel to the quarter wave plate 9. In this case, it is desirable that the quarter wave plate 9 has no incident angle dependency on the phase difference and the light energy loss. For example, the quarter wave plate 9 may have no incident angle dependency within the range where the incident angle of the incident first linearly polarized light is 30 degrees or smaller. In addition, it is desirable that a center of curvature of the reflecting surface in the concave shape of the reflecting member 10a substantially matches a light collection point of the first linearly polarized light by the dioptric system 8.

As described so far, in the present embodiment, the reflecting surface in the concave shape of the reflecting member 10a causes the reflected light in the collected state to travel. In this way, it is possible to suppress the occurrence of vignetting in the subsequent optical system and to suppress the reduction in the light use efficiency of the blue light.

In addition, since the first linearly polarized light, which is collected by the light collection optical system 6, is incident on the quarter wave plate 9, compared to the quarter wave plate 9 according to the first embodiment, it is possible to downsize the quarter wave plate 9 and reduce the cost of the quarter wave plate 9.

Fourth Embodiment

A description will be made on a light source device according to a fourth embodiment while being centered on differences from the light source device 100 according to the first embodiment. In the first embodiment, the description has been made on the configuration in which the dioptric system 8, the quarter wave plate 9, and the reflecting member 10 are spatially separated from each other. In the present embodiment, the description will be made on a configuration in which the dioptric system 8, the quarter wave plate 9, and the reflecting member 10 are arranged in close contact (optically in contact) with each other.

Figure 7:
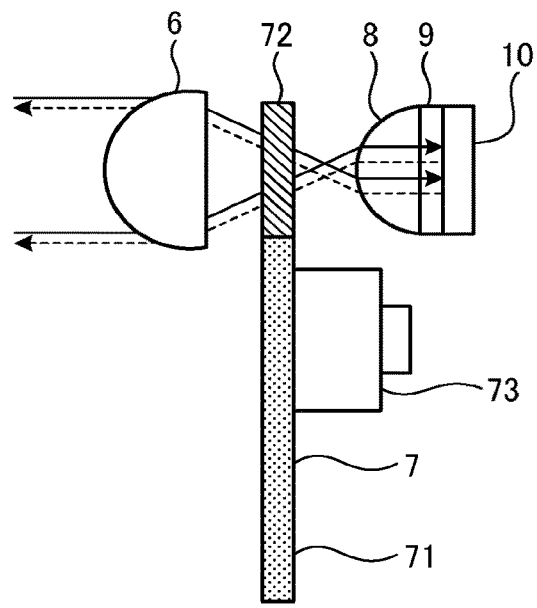
FIG. 7 is a configuration diagram of a main portion of a light source device according to a fourth embodiment.

FIG. 7 is a configuration diagram of a main portion of the light source device according to the fourth embodiment. A description will be made on the configuration of the main portion of the light source device according to the present embodiment with reference to FIG. 7. In the configuration of the main portion illustrated in FIG. 7, in the case where components have the same functions as the functions of the components of the light source device 100 according to the first embodiment illustrated in FIG. 1, such components will be denoted by the same reference numerals.

In the light source device according to the present embodiment, FIG. 7 illustrates an arrangement relationship among the light collection optical system 6, the fluorescent body unit 7, the dioptric system 8, the quarter wave plate 9, and the reflecting member 10. In addition, FIG. 7 indicates the light before being reflected by the reflecting member 10 by solid lines and the light after being reflected by the reflecting member 10 by broken lines. As illustrated in FIG. 7, a flat surface on the quarter wave plate 9 side of the dioptric system 8 and a plate surface of the quarter wave plate 9 are arranged in close contact (optically in contact) with each other, and a surface on the reflecting member 10 side of the quarter wave plate 9 and the flat reflecting surface of the reflecting member 10 are arranged in close contact (optically in contact) with each other. In this way, compared to the arrangement configuration of the dioptric system 8, the quarter wave plate 9, and the reflecting member 10 in the first embodiment, number of times of surface transmission of the blue light is reduced in the present embodiment.

More specifically, in the first embodiment, the dioptric system 8, the quarter wave plate 9, and the reflecting member 10 are separately arranged from each other. Thus, the blue light, which is transmitted through the second region 72 and incident on the dioptric system 8, is transmitted through a total of the three surfaces that are the surface on the quarter wave plate 9 side of the dioptric system 8, the plate surface on the dioptric system 8 side of the quarter wave plate 9, and the plate surface on the reflecting member 10 side of the quarter wave plate 9 before being reflected by the reflecting member 10. Furthermore, the blue light, which is reflected by the reflecting member 10, is transmitted through a total of the three surfaces that are the plate surface on the reflecting member 10 side of the quarter wave plate 9, the plate surface on the dioptric system 8 side of the quarter wave plate 9, and the surface on the quarter wave plate 9 side of the dioptric system 8. That is, the blue light is transmitted through a total of the six surfaces after the blue light is transmitted through the second region 72 and incident on the dioptric system 8 and before the blue light as the reflected light is incident on the dioptric system 8 again.

Meanwhile, in the present embodiment, the dioptric system 8, the quarter wave plate 9, and the reflecting member 10 are arranged in close contact with each other. Thus, the blue light, which is transmitted through the second region 72 and incident on the dioptric system 8, is transmitted through a contact surface between the dioptric system 8 and the quarter wave plate 9 before being reflected by the reflecting member 10. Furthermore, the blue light, which is reflected by the reflecting member 10, is transmitted through the contact surface between the quarter wave plate 9 and the dioptric system 8. That is, the blue light is transmitted through a total of the two surfaces after the blue light is transmitted through the second region 72 and incident on the dioptric system 8 and before the blue light as the reflected light is incident on the dioptric system 8 again. In this way, compared to the case of the first embodiment, it is possible to suppress the light energy loss caused by the surface transmission and improve the light use efficiency.

FIG. 7 illustrates the example in which the dioptric system 8, the quarter wave plate 9, and the reflecting member 10 are in close contact with each other. However, the present disclosure is not limited to such an example. It may be configured that the dioptric system 8 and the quarter wave plate 9 are in close contact with each other or that the quarter wave plate 9 and the reflecting member 10 are in close contact with each other. In any of these configurations, compared to the case of the first embodiment, it is possible to improve the light use efficiency.

Fifth Embodiment

A description will be made on a light source device according to a fifth embodiment while being centered on differences from the light source device 100 according to the first embodiment. In the first embodiment, the description has been made on the configuration in which the dioptric system 8, the quarter wave plate 9, and the reflecting member 10 are arranged on the downstream side of the fluorescent body unit 7. In the present embodiment, the description will be made on a configuration in which the quarter wave plate 9 and the reflecting member 10 are arranged on a fluorescent body unit.

Figure 8:
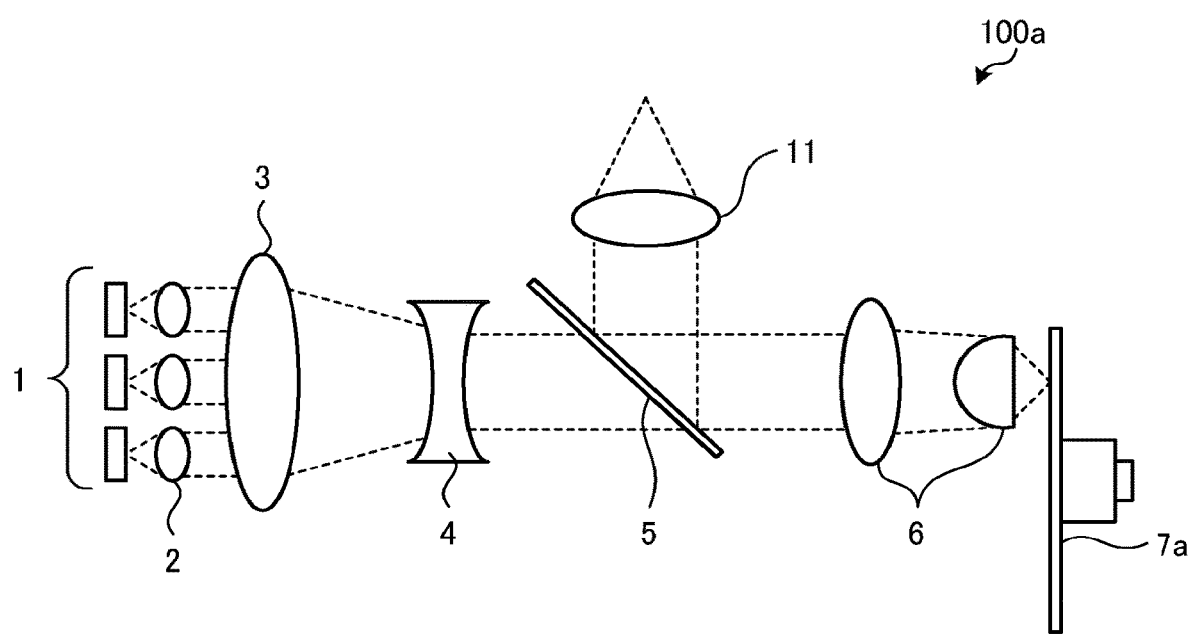
FIG. 8 is a schematic configuration diagram of a light source device according to a fifth embodiment.
Figure 9A:
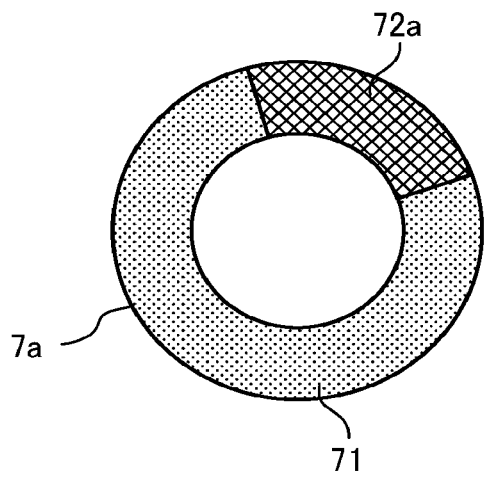
FIGS. 9A and 9B are views illustrating an example of a configuration of a fluorescent body unit according to the fifth embodiment.
Figure 9B:
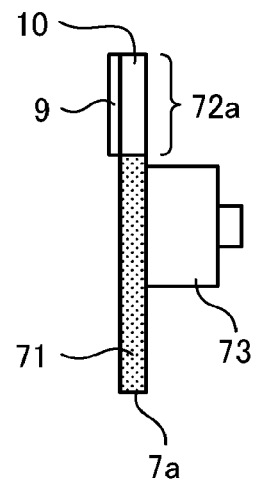

FIG. 8 is a schematic configuration diagram of the light source device according to the fifth embodiment. FIGS. 9A and 9B are views illustrating an example of a configuration of the fluorescent body unit according to the fifth embodiment. A description will be made on a configuration of a light source device 100a according to the present embodiment with reference to FIG. 8 and FIGS. 9A and 9B. In the configuration illustrated in FIG. 8 and FIGS. 9A and 9B, in the case where components have the same functions as the functions of the components of the light source device 100 according to the first embodiment illustrated in FIG. 1 and FIGS. 2A and 2B, such components will be denoted by the same reference numerals.

As illustrated in FIG. 8, a light source device 100a according to the present embodiment includes the laser light source 1, the coupling lens 2, the large aperture lens 3, the negative lens 4, the optical path separating element 5, the light collection optical system 6, a fluorescent body unit 7a (fluorescent member), and the positive lens 11. Along the forward direction of the movement of the laser light emitted from the laser light source 1, the coupling lens 2, the large aperture lens 3, the negative lens 4, the optical path separating element 5, the light collection optical system 6, and the fluorescent body unit 7a are arranged in this order. Note that the functions of the laser light source 1, the coupling lens 2, the large aperture lens 3, the negative lens 4, the optical path separating element 5, the light collection optical system 6, and the positive lens 11 are the same as the functions described in the first embodiment.

The fluorescent body unit 7a is a unit that switches between a function of converting the first linearly polarized light, which is emitted from the light collection optical system 6, into the second linearly polarized light, which is the linearly polarized light (the blue light) having the orthogonal polarization direction to the polarization direction of the first linearly polarized light, and a function of causing the first linearly polarized light to act as the excitation light and converting the excitation light into the fluorescent light whose wavelength range differs by the fluorescent body.

More specifically, the fluorescent body unit 7a has a structure illustrated in FIGS. 9A and 9B. FIG. 9A is a view of a case where the fluorescent body unit 7a is viewed from the incident direction of the first linearly polarized light, and FIG. 9B is a view of a case where the fluorescent body unit 7a is viewed from the perpendicular direction to the incident direction of the first linearly polarized light. As illustrated in FIG. 9A, for example, the fluorescent body unit 7a has an annular member, and the member is defined into a plurality of regions along a circumferential direction. More specifically, the annular member of the fluorescent body unit 7a is divided into: the first region 71 in which the fluorescent body as the wavelength converting member is applied to the reflecting member; and a second region 72a in which the quarter wave plate 9 is formed in close contact (optically in contact) on the reflecting surface of the reflecting member 10. Here, it is desirable that an optical axis of the quarter wave plate 9 is radially formed in a direction from a center of the annular shape to the outside. In this way, when the fluorescent body unit 7a rotates, the optical axis of the quarter wave plate 9 is angled at 45 degrees with respect to the polarization direction of the incident first linearly polarized light. Thus, the phase difference is not shifted at each incident position on the first region 71 (the quarter wave plate 9). Therefore, it is possible to suppress the reduction in the light use efficiency and to efficiently convert the first linearly polarized light into the circularly polarized light. In this case, the angle between the optical axis and the polarization direction does not have to be strictly 45 degrees, and "45 degrees" is a concept that includes angles near 45 degrees.

In the case where the first linearly polarized light emitted from the light collection optical system 6 is incident on the first region 71, as described above in the first embodiment, the first linearly polarized light acts as the excitation light for the fluorescent body, and the wavelength of the excitation light is converted by the fluorescent body. For example, the excitation light is converted into the fluorescent light, whose center of the emission intensity is 550 [nm], in the yellow wavelength range, and is subjected to the Lambertian reflection by the action of the fluorescent body and the action of the reflecting member. In addition, in the case where the first linearly polarized light emitted from the light collection optical system 6 is incident on the second region 72a, the first linearly polarized light is converted into the circularly polarized light when being transmitted through the quarter wave plate 9. Thereafter, when the circularly polarized light is reflected by the reflecting member 10, the phase of the circularly polarized light is reversed, and the circularly polarized light becomes the circularly polarized light in the reverse direction. Then, the circularly polarized light in the reverse direction is transmitted through the quarter wave plate 9 again. In this way, the circularly polarized light in the reverse direction is converted into the second linearly polarized light, which is the linearly polarized light (the blue light) having the orthogonal polarization direction to the polarization direction of the first linearly polarized light. That is, the first linearly polarized light emitted from the light collection optical system 6 is reflected by any of the first region 71 and the second region 72a, and thus is not transmitted through the first region 71 or the second region 72a.

Note that the annular member of the fluorescent body unit 7a is not limited to being defined into the two regions (the first region 71 and the second region 72a). For example, the annular member of the fluorescent body unit 7a may be configured that the plurality of first regions 71 and the plurality of second regions 72a are alternately arranged along the circumferential direction.

As illustrated in FIG. 9B, the drive unit 73 such as the motor is coupled to the annular member, which is configured to include the first region 71 and the second region 72a. The annular member, which is formed of the first region 71 and the second region 72a, rotates in the circumferential direction when the drive unit 73 is rotationally driven about the axis orthogonal to the surface of the member. Just as described, when the annular member rotates in the circumferential direction, the first linearly polarized light emitted from the light collection optical system 6 is sequentially incident on the first region 71 and the second region 72a.

A description will be made on behavior of the light on the blue light path in the light source device 100a with reference to FIG. 8. Here, the blue light path means an optical path on which, of the first linearly polarized light emitted by the laser light source 1, the light to be reflected by the second region 72a of the fluorescent body unit 7a travels.

First, the laser light source 1 emits the blue light (the first linearly polarized light) as the linearly polarized light (for example, the P-polarized light with respect to the incident surface of the optical path separating element 5) whose polarization direction is the fixed direction. The coupling lens 2 converts the first linearly polarized light emitted from the laser light source 1 into the parallel light (the collimated light). The first linearly polarized light (the parallel light)

emitted from the coupling lens 2 is collected and synthesized by the large aperture lens 3, and is thereafter converted into the parallel light by the negative lens 4. The first linearly polarized light (the parallel light) emitted from the negative lens 4 is incident on the optical path separating element 5. However, since the first linearly polarized light (the parallel light) is the P-polarized light, the first linearly polarized light (the parallel light) is transmitted through the optical path separating element 5 and travels to the light collection optical system 6. The light collection optical system 6 collects the first linearly polarized light transmitted through the optical path separating element 5.

Here, it is assumed that the first linearly polarized light collected by the light collection optical system 6 is incident on the second region 72a of the fluorescent body unit 7. The first linearly polarized light incident on the second region 72a is converted into the circularly polarized light when being transmitted through the quarter wave plate 9 in the second region 72a. The circularly polarized light that is converted by the quarter wave plate 9 is reflected by the reflecting member 10, and the phase of the circularly polarized light is reversed. As a result, the circularly polarized light becomes the circularly polarized light in the reverse direction and is incident on the quarter wave plate 9 again. The circularly polarized light in the reverse direction, which is incident on the quarter wave plate 9, is transmitted through the quarter wave plate 9 again. As a result, the circularly polarized light in the reverse direction is converted into the second linearly polarized light, which is the linearly polarized light (the blue light) having the orthogonal polarization direction to the polarization direction of the first linearly polarized light. In the case where the first linearly polarized light is the P-polarized light, the second linearly polarized light is the S-polarized light.

The light collection optical system 6 converts the second linearly polarized light, which is converted by the quarter wave plate 9, into the parallel light. The second linearly polarized light (the parallel light) emitted from the light collection optical system 6 is incident on the optical path separating element 5. However, since the second linearly polarized light (the parallel light) is the S-polarized light, the second linearly polarized light (the parallel light) is reflected by the optical path separating element 5 and travels to the positive lens 11. The positive lens 11 collects the second linearly polarized light reflected by the optical path separating element 5 and emits the second linearly polarized light to the outside of the light source device 100a.

Note that the behavior of the light on the fluorescent light path is as described above in the first embodiment.

As described above, in the case where the first linearly polarized light emitted from the light collection optical system 6 is incident on the second region 72a due to the rotation of the annular member of the fluorescent body unit 7a, the first linearly polarized light is switched to exhibit the behavior on the blue light path. In the case where the first linearly polarized light is incident on the first region 71, the first linearly polarized light is switched to exhibit the behavior on the fluorescence light path. In addition, due to operation of the light source device 100a as described above, the first linearly polarized light, which is the blue light emitted from the laser light source 1, is substantially separated into the second linearly polarized light as the blue light and the fluorescent light, is guided to the different optical path from the optical path of the first linearly polarized light, and is emitted to the outside of the light source device 100a.

As it has been described so far, in the light source device 100a according to the present embodiment, the quarter wave plate 9 is arranged in the second region 72a of the fluorescent body unit 7a. Thus, it is configured that, of the first linearly polarized light emitted from the laser light source 1 and transmitted through the optical path separating element 5, the blue light that is not converted into the fluorescent light is transmitted through the quarter wave plate 9. That is, it is configured that, of the first linearly polarized light transmitted through the optical path separating element 5, the fluorescent light whose wavelength is converted and which is reflected by the first region 71 of the fluorescent body unit 7a is not transmitted through the quarter wave plate 9. Thus, the light use efficiency of the fluorescent light is not reduced in association with the transmission through the quarter wave plate 9. Therefore, it is possible to suppress the reduction in the light use efficiency in the fluorescent light path, that is, the reduction in the light use efficiency of the fluorescent light.

Of the first linearly polarized light transmitted through the optical path separating element 5, almost all the blue light incident on the first region 71 of the fluorescent body unit 7a is converted into the fluorescent light. However, a part of the blue light is not converted into the fluorescent light, remains as the first linearly polarized light, and is reflected by first region 71. Here, in the conventional configuration, the light corresponding to the first linearly polarized light, which is not converted into the fluorescent light, is transmitted through the quarter wave plate and thereby becomes the light corresponding to the second linearly polarized light. As a result, such light is guided to the same optical path as the optical path of the fluorescent light. On the contrary, in the present embodiment, the first linearly polarized light, which is not converted into the fluorescent light, is not transmitted through the quarter wave plate 9. Thus, the polarization direction of the first linearly polarized light is not changed, and the first linearly polarized light is incident on the optical path separating element 5. As a result, the first linearly polarized light is guided to the different optical path from the optical path of the fluorescent light. Therefore, the blue light is not mixed in the fluorescent light generated by the light source device 100a according to the present embodiment.

Since the light collection optical system 6 is arranged on an upstream side of the fluorescent body unit 7a, a light collection spot on the fluorescent body unit 7a (the first region 71) can be made small. As a result, the generation of the fluorescent light by the fluorescent body is facilitated, and the light use efficiency of the fluorescent light can be improved.

Sixth Embodiment

A description will be made on a light source device according to a sixth embodiment while being centered on differences from the light source device 100 according to the first embodiment. In the first embodiment, the description has been made on the configuration that the light transmitted through the optical path separating element 5 travels to the fluorescent body unit 7. In the present embodiment, the description will be made on the configuration that the light reflected by the optical path separating element 5 travels to the fluorescent body unit 7.

Figure 10:
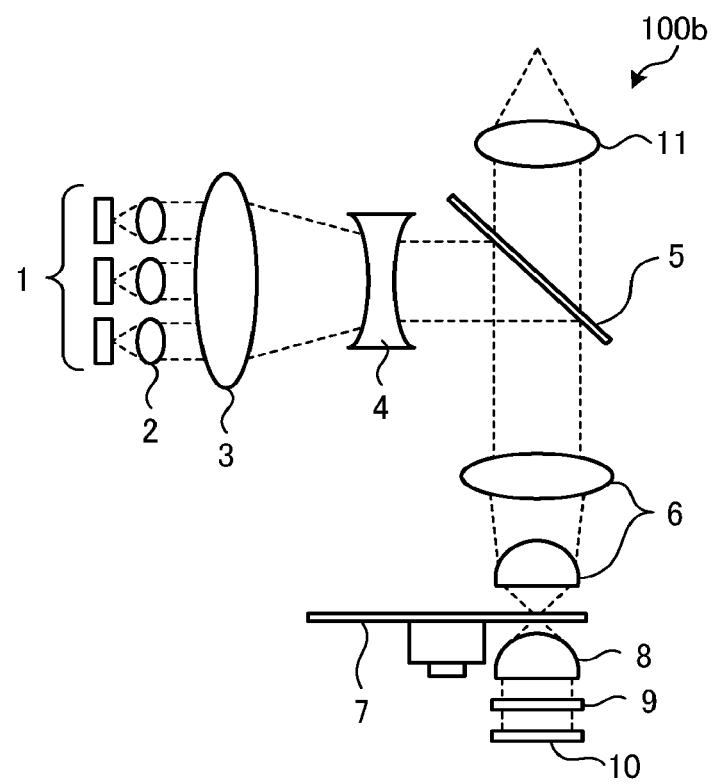
FIG. 10 is a schematic configuration diagram of a light source device according to a sixth embodiment.

FIG. 10 is a schematic configuration diagram of the light source device according to the sixth embodiment. A description will be made on a configuration of a light source device 100b according to the present embodiment with reference to FIG. 10.

As illustrated in FIG. 1, the light source device 100b according to the present embodiment includes the laser light source 1 (the example of the light source), the coupling lens 2, the large aperture lens 3, the negative lens 4, the optical path separating element 5, the light collection optical system 6, the fluorescent body unit 7, the dioptric system 8, the quarter wave plate 9 (the example of the wave plate), the reflecting member 10, and the positive lens 11. Along the forward direction of the movement of the laser light emitted from the laser light source 1, the coupling lens 2, the large aperture lens 3, the negative lens 4, the optical path separating element 5, the light collection optical system 6, the fluorescent body unit 7, the dioptric system 8, the quarter wave plate 9, and the reflecting member 10 are arranged in this order. However, differing from the first embodiment, the coupling lens 2, the large aperture lens 3, the negative lens 4, the optical path separating element 5, the light collection optical system 6, the fluorescent body unit 7, the dioptric system 8, the quarter wave plate 9, and the reflecting member 10 are arranged such that the light reflected by the optical path separating element 5 travels to the light collection optical system 6.

The optical path separating element 5 is the polarization separation element arranged to be inclined with respect to the propagation direction of the blue light emitted from the negative lens 4. Here, like the blue light emitted from the negative lens 4, the blue light that is the linearly polarized light in the particular polarization direction (the first polarization direction) originated from the blue light emitted from the laser light source 1 may hereinafter be referred to as the first linearly polarized light. In addition, a description will be made on an assumption that the first linearly polarized light, which is the blue light emitted from the negative lens 4 and originated from the blue light emitted from the laser light source 1 and which is the linearly polarized light in the particular polarization direction (the first polarization direction), is the P-polarized light. That is, the laser light source 1 and the optical path separating element 5 have such relative positions that the first linearly polarized light becomes the P-polarized light with respect to the incident surface of the optical path separating element 5. The optical path separating element 5 has an optical characteristic to reflect the first linearly polarized light, which is the P-polarized light emitted from the negative lens 4, and transmit the fluorescent light, which is converted from the first linearly polarized light by the fluorescent body in the fluorescent body unit 7, and the blue light as the S-polarized light converted from the first linearly polarized light by the function of the quarter wave plate 9 and the function of the reflecting member 10. Here, similar to the first embodiment, the blue light, which is the S-polarized light converted from the first linearly polarized light by the function of the quarter wave plate 9 and the function of the reflecting member 10, that is, the linearly polarized light having the polarization direction (the second polarization direction) that is orthogonal to the polarization direction (the first polarization direction) of the first linearly polarized light may be referred to as the second linearly polarized light. That is, the optical path separating element 5 guides the first linearly polarized light and each of the fluorescent light and the second linearly polarized light to the different optical paths.

As described above, the first linearly polarized light is described as the P-polarized light, and the second linearly polarized light is described as the S-polarized light. However, the first linearly polarized light and the second linearly polarized light are not limited thereto. In the case where the first linearly polarized light is the S-polarized light, the second linearly polarized light is the P-polarized light.

The light collection optical system 6 is an optical system that collects the first linearly polarized light reflected by the optical path separating element 5 and guides the first linearly polarized light to the fluorescent body unit 7.

Note that the functions of the laser light source 1, the coupling lens 2, the large aperture lens 3, the negative lens 4, the fluorescent body unit 7, the dioptric system 8, the quarter wave plate 9, and the reflecting member 10 are the same as the functions described in the first embodiment.

First, the laser light source 1 emits the blue light (the first linearly polarized light) as the linearly polarized light (for example, the P-polarized light with respect to the incident surface of the optical path separating element 5) whose polarization direction is the fixed direction. The coupling lens 2 converts the first linearly polarized light emitted from the laser light source 1 into the parallel light (the collimated light). The first linearly polarized light (the parallel light) emitted from the coupling lens 2 is collected and synthesized by the large aperture lens 3, and is thereafter converted into the parallel light by the negative lens 4. The first linearly polarized light (the parallel light) emitted from the negative lens 4 is incident on the optical path separating element 5, is reflected by the optical path separating element 5, and travels to the light collection optical system 6. The light collection optical system 6 collects the first linearly polarized light reflected by the optical path separating element 5.

Here, it is assumed that the first linearly polarized light collected by the light collection optical system 6 is incident on the second region 72 of the fluorescent body unit 7. The first linearly polarized light incident on the second region 72 is transmitted through the second region 72 and travels to the dioptric system 8. The dioptric system 8 converts the first linearly polarized light transmitted through the second region 72 into the parallel light. The first linearly polarized light (the parallel light) emitted from the dioptric system 8 is transmitted through the quarter wave plate 9 and thereby converted into the circularly polarized light. The circularly polarized light emitted from the quarter wave plate 9 is reflected by the reflecting member 10, and the phase of the circularly polarized light is reversed. As a result, the circularly polarized light becomes the circularly polarized light in the reverse direction and travels to the quarter wave plate 9 again.

The circularly polarized light in the reverse direction, which is reflected by the reflecting member 10, is transmitted through the quarter wave plate 9 and thus converted into the second linearly polarized light, which is the linearly polarized light (the blue light) having the orthogonal polarization direction to the polarization direction of the first linearly polarized light. In the case where the first linearly polarized light is the P-polarized light, the second linearly polarized light is the S-polarized light. The dioptric system 8 collects the second linearly polarized light converted by the quarter wave plate 9. The second linearly polarized light collected by the dioptric system 8 is incident on the second region 72 of the fluorescent body unit 7. The second linearly polarized light incident on the second region 72 is transmitted through the second region 72 and travels to the light collection optical system 6. The light collection optical system 6 converts the second linearly polarized light transmitted through the second region 72 into the parallel light. The second linearly polarized light (the parallel light) emitted from the light collection optical system 6 is incident on the optical path separating element 5, is transmitted through the optical path separating element 5, and travels to the positive lens 11. The positive lens 11 collects the second linearly polarized light transmitted through the optical path separating element 5 and emits the second linearly polarized light to the outside of the light source device 100b.

The behavior of the first linearly polarized light emitted from the laser light source 1 is the same as the behavior of the first linearly polarized light on the blue light path described above until the first linearly polarized light is collected by the light collection optical system 6. Here, it is assumed that the first linearly polarized light collected by the light collection optical system 6 is incident on the first region 71 of the fluorescent body unit 7. The first linearly polarized light incident on the first region 71 acts as the excitation light for the fluorescent body, and the wavelength of the excitation light is converted by the fluorescent body. For example, the excitation light is converted into the fluorescent light in the yellow wavelength range, and is subjected to the Lambertian reflection by the action of the fluorescent body and the action of the reflecting member. The light collection optical system 6 converts the fluorescent light subjected to the Lambertian reflection by the first region 71 into the parallel light. The fluorescent light (the parallel light) emitted from the light collection optical system 6 is transmitted through the optical path separating element 5 and travels to the positive lens 11. The positive lens 11 collects the fluorescent light reflected by the optical path separating element 5 and emits the fluorescent light to the outside of the light source device 100b.

As described above with reference to FIG. 4 and FIG. 5 in the first embodiment, in the case where the first linearly polarized light emitted from the light collection optical system 6 is incident on the second region 72 due to the rotation of the annular member of the fluorescent body unit 7, the first linearly polarized light is switched to exhibit the behavior on the blue light path. In the case where the first linearly polarized light is incident on the first region 71, the first linearly polarized light is switched to exhibit the behavior on the fluorescence light path. In addition, due to operation of the light source device 100b as described above, the first linearly polarized light, which is the blue light emitted from the laser light source 1, is substantially separated into the second linearly polarized light as the blue light and the fluorescent light, is guided to the different optical path from the optical path of the first linearly polarized light, and is emitted to the outside of the light source device 100b.

As it has been described so far, in the light source device 100b according to the present embodiment, the quarter wave plate 9 is arranged on the downstream side of the fluorescent body unit 7. Thus, it is configured that, of the first linearly polarized light emitted from the laser light source 1 and reflected by the optical path separating element 5, the blue light transmitted through the second region 72 of the fluorescent body unit 7 is transmitted through the quarter wave plate 9. That is, it is configured that, of the first linearly polarized light transmitted through the optical path separating element 5, the fluorescent light whose wavelength is converted and which is reflected by the first region 71 of the fluorescent body unit 7 is not transmitted through the quarter wave plate 9. Thus, the light use efficiency of the fluorescent light is not reduced in association with the transmission through the quarter wave plate 9. Therefore, it is possible to suppress the reduction in the light use efficiency in the fluorescent light path, that is, the reduction in the light use efficiency of the fluorescent light. The other effects are similar to the effects of the first embodiment.

Note that any of the configurations according to the second embodiment to the fifth embodiment described above can also be applied to the light source device 100b according to the present embodiment.

Seventh Embodiment

Figure 11:
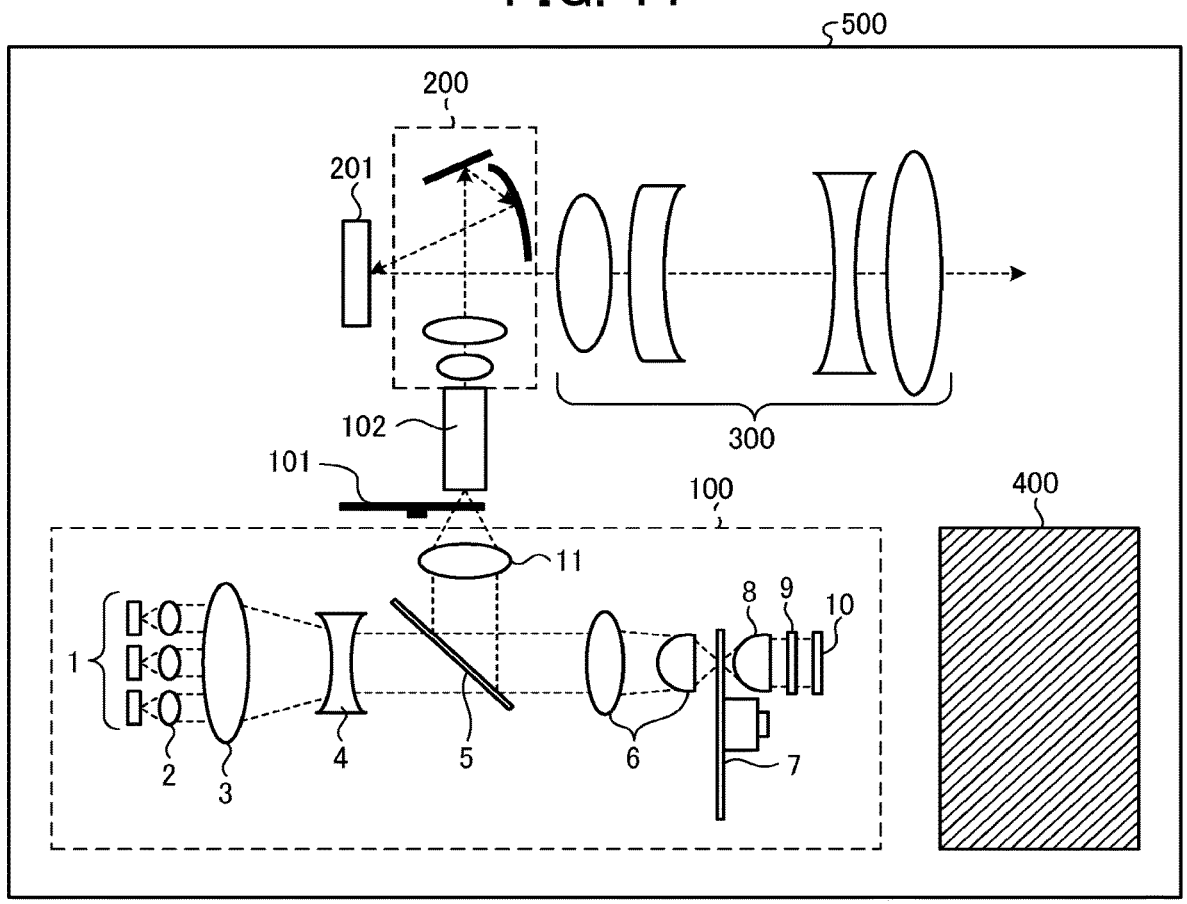
FIG. 11 is a schematic configuration diagram of a projector apparatus according to a seventh embodiment.
Figure 12A:
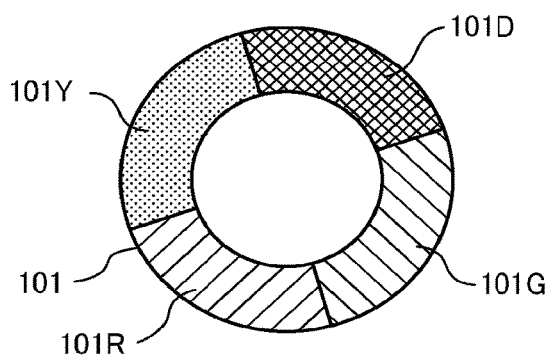
FIGS. 12A and 12B are views illustrating an example of a configuration of a color wheel according to the seventh embodiment.
Figure 12B:
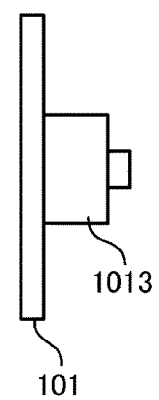

FIG. 11 is a schematic configuration diagram of a projector apparatus according to a seventh embodiment. FIGS. 12A and 12B are views illustrating an example of a configuration of a color wheel in the seventh embodiment. A description will be made on a configuration of a projector apparatus 500 according to the present embodiment with reference to FIG. 11 and FIGS. 12A and 12B. Although any of the light source devices according to the first embodiment to the fifth embodiment can be applied as the light source device provided in the projector apparatus 500, a description will hereinafter be made that the light source device 100 according to the first embodiment is provided.

As illustrated in FIG. 11, the projector apparatus 500 according to the present embodiment includes the light source device 100, a color wheel 101, a light mixing element 102, an illumination optical system 200, an image display element 201, and a projection optical system 300. Note that the configuration and the operation of the light source device 100 are as described above in the first embodiment.

The color wheel 101 is a member that separates the blue light (the second linearly polarized light) and the fluorescent light, which are generated by the light source device 100, into desired colors. More specifically, the color wheel 101 has a structure illustrated in FIGS. 12A and 12B, for example. FIG. 12A is a view of a case where the color wheel 101 is viewed from the incident directions of the blue light and the fluorescent light, and FIG. 12B is a view of a case where the color wheel 101 is viewed from a perpendicular direction to the incident direction of the incident directions of the blue light and the fluorescent light. As illustrated in FIG. 12A, for example, similar to the fluorescent body unit 7, the color wheel 101 has an annular member, and the member is defined into a plurality of regions along a circumferential direction. More specifically, the annular member of the color wheel 101 is divided into a diffusion region 101D, a filter region 101R, a filter region 101G, and a filter region 101Y.

The diffusion region 101D is a region for transmitting and diffusing the blue light emitted from the light source device 100. The filter region 101R is a region through which, of the fluorescent light emitted from the light source device 100, light in a wavelength range of a red component is transmitted. The filter region 101G is a region through which, of the fluorescent light emitted from the light source device 100, light in a wavelength range of a green component is transmitted. The filter region 101Y is a region through which, of the fluorescent light emitted from the light source device 100, light in a wavelength range of a yellow component is transmitted.

The light transmitted through each of the regions in the color wheel 101 is incident on the light mixing element 102.

As described above, the color wheel 101 has the regions through which, of the fluorescent light, the light of the red component, the light of the green component, and the light of the yellow component of the fluorescent light are transmitted. However, the color wheel 101 is not limited thereto. For example, the color wheel 101 may have the regions through which, of the fluorescent light, the light of the red component and the light of the green component are transmitted.

In addition, an area ratio of the regions of the color wheel 101 is based on a design specification of the light source device 100. However, for example, since the blue light emitted from the light source device 100 is transmitted through the diffusion region 101D in the color wheel 101, a ratio of an area of the second region 72 to a total area of the annular member of the fluorescent body unit 7 may match a ratio of an area of the diffusion region 101D to a total area of the color wheel 101.

As illustrated in FIG. 12B, a drive unit 1013 is coupled to the annular member, which is configured to include the plurality of regions of the color wheel 101. The annular member rotates in the circumferential direction when the drive unit 1013 is rotationally driven about an axis orthogonal to a surface of the member. Just as described, when the annular member rotates in the circumferential direction, the blue light emitted from the light source device 100 is incident on the diffusion region 101D, and the fluorescent light emitted from the light source device 100 is sequentially incident on the filter region 101R, the filter region 101G, and the filter region 101Y. The light (the blue light and the fluorescent light) emitted from the light source device 100 is transmitted through the color wheel 101. In this way, the blue light, green light, red light, and yellow light are sequentially emitted.

The light mixing element 102 is an element that uniformizes distribution of the light transmitted through the color wheel 101.

The illumination optical system 200 is an optical system that guides and emits the light uniformized by the light mixing element 102 to the image display element 201. The image display element 201 is the DMD, for example. The image display element 201 drives a minute mirror in synchronization with the light (the blue light, the green light, the red light, the yellow light) emitted from the illumination optical system 200 to generate a color image, and irradiates the projection optical system 300 with the color image.

The projection optical system 300 is an optical system that enlarges and projects the color image emitted from the image display element 201 on a projection surface (screen).

A cooler 400 is a device that cools each of the elements and the devices generating heat in the projector apparatus 500.

As described so far, in the projector apparatus 500 according to the present embodiment, the light source device 100 is used to suppress the reduction in the light use efficiency in the fluorescent light path, that is, the light use efficiency of the fluorescent light. Thus, the high-brightness projector apparatus 500 can be provided. The light source device to be used is not limited to the light source device 100. Any of the light source devices according to the second embodiment to the fifth embodiment may be used. Also, in this case, the same effects are exerted.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A light source device comprising:
   a light source configured to emit first color light;
   a fluorescent member having: a first region that includes a fluorescent body configured to convert at least a part of the first color light into second color light different from the first color light when being irradiated with the first color light; and a second region configured to transmit the first color light;
   a wave plate provided on a side opposite to an incident side of the first color light of the fluorescent member and configured to generate a phase difference of the first color light;
   a reflecting member configured to reflect the first color light transmitted through the wave plate; and
   an optical path separating element provided on an optical path between the light source and the fluorescent member and configured to transmit one of the first color light emitted from the light source and reflected light of the first color light by the reflecting member, reflect another one of the first color light emitted from the light source and the reflected light of the first color light by the reflecting member, and guide the second color light to the same optical path as an optical path of the reflected light, wherein
   the first color light transmitted through the second region is transmitted through the wave plate, is reflected by the reflecting member, and is transmitted through the wave plate again.

2. The light source device according to claim 1 further comprising:
   a light collection optical system arranged between the optical path separating element and the fluorescent member and configured to collect the first color light emitted from the light source and guide the first color light to the fluorescent member.

3. The light source device according to claim 2, wherein the wave plate has no incident angle dependency on at least the phase difference within a range where an incident angle of the incident first color light is 30 degrees or smaller.

4. The light source device according to claim 2, wherein the reflecting member is configured to reflect the first color light transmitted through the wave plate by positive power.

5. The light source device according to claim 1 further comprising:
   a dioptric system arranged between the fluorescent member and the wave plate and configured to convert the first color light transmitted through the second region into parallel light.

6. The light source device according to claim 5, wherein the wave plate is in optical contact with the reflecting member.

7. The light source device according to claim 6, wherein the dioptric system is in optical contact with the wave plate.

8. A light source device comprising:
   a light source configured to emit first color light;
   a fluorescent member having: a first region that includes a fluorescent body configured to convert at least a part of the first color light into second color light different from the first color light when being irradiated with the first color light; and a second region that has a reflecting surface configured to reflect the first color light;
   a wave plate arranged on at least a part of the reflecting surface; and
   an optical path separating element provided on an optical path between the light source and the fluorescent member and configured to transmit one of the first color light emitted from the light source and reflected light of the first color light by the reflecting surface, reflect another one of the first color light emitted from the light source and the reflected light of the first color light by the reflecting surface, and guide the second color light to the same optical path as an optical path of the reflected light, wherein the first color light transmitted through the wave plate is reflected by the reflecting surface, and is transmitted through the wave plate again.

9. The light source device according to claim 8, wherein the wave plate is configured that an optical axis is angled at 45 degrees with respect to a polarization direction of the first color light incident on the wave plate in the case where the fluorescent member is driven.

10. An image display apparatus comprising:

the light source device according to claim 1;

an illumination optical system configured to guide light emitted from the light source device to an image display element; and a projection optical system configured to use the light guided by the illumination optical system, so as to project an image generated by the image display element.

* * * * *